(12) United States Patent
Ramirez et al.

(10) Patent No.: US 6,997,236 B2
(45) Date of Patent: Feb. 14, 2006

(54) BEARING ARRANGEMENT FOR A CENTRIFUGAL CASTING MACHINE

(75) Inventors: Rivio Arturo Ramirez, Joinville-Sc (BR); Antonio Sardo, Joinville-Sc (BR)

(73) Assignee: Empresa Brasileira de Compressores S.A., Embraco Joinville (BR)

( * ) Notice: Subject to any disclaimer, the term of this patent is extended or adjusted under 35 U.S.C. 154(b) by 0 days.

(21) Appl. No.: 10/498,453

(22) PCT Filed: Dec. 9, 2002

(86) PCT No.: PCT/BR02/00177

§ 371 (c)(1),
(2), (4) Date: Jun. 7, 2004

(87) PCT Pub. No.: WO03/049886

PCT Pub. Date: Jun. 19, 2003

(65) Prior Publication Data

US 2005/0082029 A1    Apr. 21, 2005

(30) Foreign Application Priority Data

Dec. 13, 2001  (BR) .................................... 0106345

(51) Int. Cl.
*B22D 13/00* (2006.01)

(52) U.S. Cl. .................... 164/286; 164/287; 164/288; 164/289; 164/291; 164/292; 164/293

(58) Field of Classification Search ................ 164/286, 164/287, 288, 289, 290, 291, 292, 293, 114, 164/117

See application file for complete search history.

(56) References Cited

U.S. PATENT DOCUMENTS

| | | | |
|---|---|---|---|
| 1,954,665 A | | 4/1934 | Dake |
| 2,304,067 A | * | 12/1942 | Anderson .................... 164/493 |
| 2,381,616 A | | 8/1945 | Pfleger |
| 2,601,389 A | | 6/1952 | Guelph |
| 4,492,264 A | * | 1/1985 | Gaddi .......................... 164/292 |
| 4,593,502 A | * | 6/1986 | Buckle ....................... 52/167.7 |
| 6,499,529 B1 | * | 12/2002 | Farkas .......................... 164/114 |

* cited by examiner

*Primary Examiner*—Kevin Kerns
*Assistant Examiner*—I.-H. Lin
(74) *Attorney, Agent, or Firm*—Darby & Darby

(57) ABSTRACT

A bearing arrangement for a centrifugation injection mold, comprising an upper mold portion (10) and a lower mold portion (20), which are respectively and rotatively mounted to an upper bearing (30) and to a lower bearing (40), the latter comprising: a first flat ring (41) affixed to a machine structure (E) and presenting a radial gap that is internal in relation to the lower mold portion (20); an annular cage (42) bearing spheres (44) seated on the first flat ring (41), said annular cage (42) presenting radial gaps that are external and internal in relation to the machine structure (E) and to the lower mold portion (20), respectively; and a second flat ring (45) inferiorly seated on the spheres (44) of the annular cage (42) and maintaining radial gaps that are external and internal in relation to the machine structure (E) and to the lower mold portion (20), respectively, axially bearing the latter. The lower mold portion (20) incorporates an annular conical seat (25) on which is seated, when the mold (M) is taken to the closed position, an annular conical guide (15) incorporated to the upper mold portion (10).

9 Claims, 2 Drawing Sheets

BEARING ARRANGEMENT FOR A CENTRIFUGAL CASTING MACHINE

CROSS-REFERENCE TO RELATED APPLICATION

This application is a 371 of PCT/BR02/00177 filed on Dec. 9, 2002.

FIELD OF THE INVENTION

The present invention refers to a bearing arrangement for two-piece molds used in the centrifugation injection of the cage made of aluminum or other adequate material into the stack of steel laminations of an electric motor rotor, particularly the rotor of small electric motors, such as those used in the hermetic compressors of small refrigeration systems.

BACKGROUND OF THE INVENTION

It is already known from the prior art the injection effected by centrifugation of the aluminum cages in rotors, which are formed by a stack of overlapped annular steel laminations provided with openings that are longitudinally aligned with the openings of the other laminations of the stack, in order to define a plurality of axial channels interconnecting the external faces of the end laminations of the stack and which are angularly spaced from each other along a circular alignment, which is concentric to the longitudinal axis of the lamination stack, but radially spaced back in relation to the lateral face of the latter.

The lamination stack, with its longitudinal axis vertically disposed, is positioned in the interior of a mold that defines a lower annular cavity close to the external face of the lower end lamination, and an upper cavity, which is substantially cylindrical or frusto-conical, close to the external face of the upper end lamination and opened to a channel for the entry of aluminum into the mold.

During the aluminum pouring, the lamination stack has its central axial bore, in which will be later mounted the shaft of the electric motor, filled with a core, which has an upper end substantially leveled with the upper end lamination the lamination loan and stack, and a widened upper end lower portion, which is seated on a respective lower end widening of the central axial hole of the lamination stack and against the mold portion that defines the lower cavity.

The aluminum is poured into the lower cavity, passing through the axial channels of the lamination stack to the lower cavity, filling the latter, the axial channels, and the upper cavity, in this order, and solidifying in a radial inward upward pattern, as the mold rotates around its vertical axis and the metal cools.

Upon completion of the aluminum pouring and solidification, the mold is opened and the formed rotor is submitted to one or more operations to eliminate the inlet channel and unobstruct the adjacent end of the central axial bore of the lamination stack, and to define the correct inner profile for the upper ring of the aluminum cage, which further comprises a single piece lower ring, which is already formed by the mold, and a plurality of bars formed in the interior of the axial channels of the lamination stack.

In the centrifugation injection of these rotors, the upper and lower cavities of the mold and the lamination stack itself are heated, so that the aluminum passes through the upper cavity and through the axial channels of the lamination stack without solidifying, gravitationally reaching the lower cavity, filling it and beginning to solidify, from the outside to the inside and from the bottom upwardly, as the mold rotates.

In order that the injection mold involving and locking superiorly and inferiorly the lamination stack can rotate around its vertical longitudinal axis, the upper and lower cavities of the mold are mounted, respectively, onto an upper bearing and a lower bearing that are carried by the structure of the injection equipment.

In the bearing arrangements of the type mentioned above, the occurrence of deviations of concentricity and parallelism between the axes of the upper and lower cavities cause vibrations in both the mold and the lamination stack during rotation of the mold, which vibrations act on the metallic material being solidified in the upper and lower cavities.

A major problem caused by said vibrations of the rotating mold during the solidification of the aluminum, is that the bars of the cage, which are formed in the interior of the axial channels of the lamination stack, and even the rings tend to present cracks, the bars being transversally broken inside the lamination stack in a way not perceptible by an external visual checking of the finished rotor. The breakage or crack of one or more bars, or of the upper or lower rings of the cage will considerably impair the quality of the rotor and consequently the efficiency of the electric motor to be formed.

One of the possibilities to minimize or even eliminate the loss of quality by undue vibrations of the mold during the aluminum solidification is to mount both cavities of the mold to only one lower bearing, whereby the shafts of both parts of the mold are unified. However, in this solution, the upper and lower cavities of the mold are guided by columns that are affixed to the lower cavity. The upper cavity is axially displaceable, guided by the columns, to open and close the mold, whereby the upper cavity is slidingly retained in the columns, considerably limiting the automation of the operations of feeding the lamination stack in the mold, and also the removal of the centrifuged rotor, besides the problems of concentricity and rotor strike.

OBJECTS OF THE INVENTION

Aiming at solving the deficiencies of the bearing arrangements for centrifugation injection molds proposed by the prior art, the present invention proposes a bearing arrangement of relatively simple construction, which is efficient to assure the balanced rotation of the mold during the solidification of the cage in the lamination stack, avoiding vibrations and rupture of the component parts of the cage, particularly the bars thereof, and substantially minimizing the problems of concentricity and rotor strike.

It is a more specific object of the present invention to provide a bearing arrangement, such as mentioned above, which presents the upper and lower cavities of the mold rotatively mounted to respective bearings.

SUMMARY OF THE INVENTION

The bearing arrangement of the present invention is applied to a centrifugation injection mold of aluminum or other metallic alloy, which is adequate to form several parts, such as for example, the cage of an electric motor rotor used in hermetic compressors.

The injection mold is of the type that comprises an upper mold portion and a lower mold portion, which are axially displaceable between an open mold position and a closed mold position and respectively and rotatively mounted to an upper bearing and to a lower bearing that are affixed to a machine structure for centrifugation injection.

According to the invention, the lower bearing comprises: a first flat ring affixed to the machine structure, orthogonally to the axis of the lower mold portion, and presenting a radial gap that is internal in relation to the lower mold portion; an annular cage having axial through housings bearing respective spheres seated on the first flat ring, said annular cage presenting radial gaps, which are external and internal in relation to the machine structure and to the lower mold portion, respectively; and a second flat ring, which is inferiorly seated on the spheres of the annular cage immediately below, in order to axially bear the lower mold portion, and which presents radial gaps, which are external and internal in relation to the machine structure and to the lower mold portion, respectively.

This constructive arrangement allows for a certain relative radial displacement between the lower mold portion and the machine structure, with the annular cage of spheres being free to radially adjust itself between two consecutive flat rings.

Thus, the lower mold portion can be displaced so that its axis be aligned with the axis of the upper mold portion.

In order to bring the lower mold portion to an operative position aligned with the upper mold portion, the former incorporates an annular upper conical seat, which is orthogonal and concentric to its axis and on which is seated, when the mold is taken to the closed position, an annular conical guide incorporated to the upper mold portion orthogonally and concentrically to the axis of the upper mold portion.

BRIEF DESCRIPTION OF THE DRAWINGS

The invention will be described below, with reference to the enclosed drawings, in which.

DETAILED DESCRIPTION OF THE ILLUSTRATED EMBODIMENT

Figure 1:
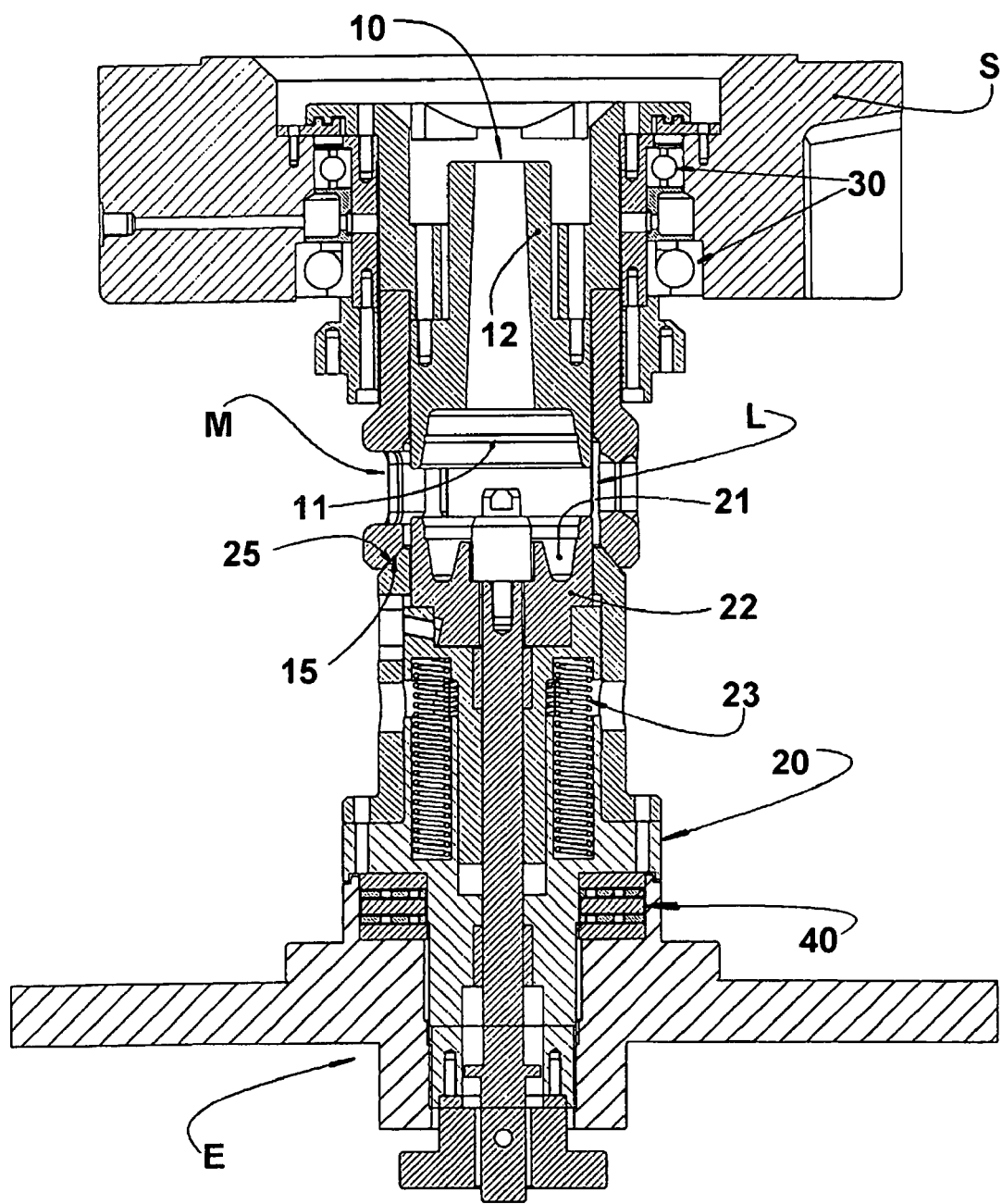
FIG. 1 is a simplified diametrical vertical sectional view of an injection mold in the closed condition and using the bearing arrangement of the present invention.
Figure 2:
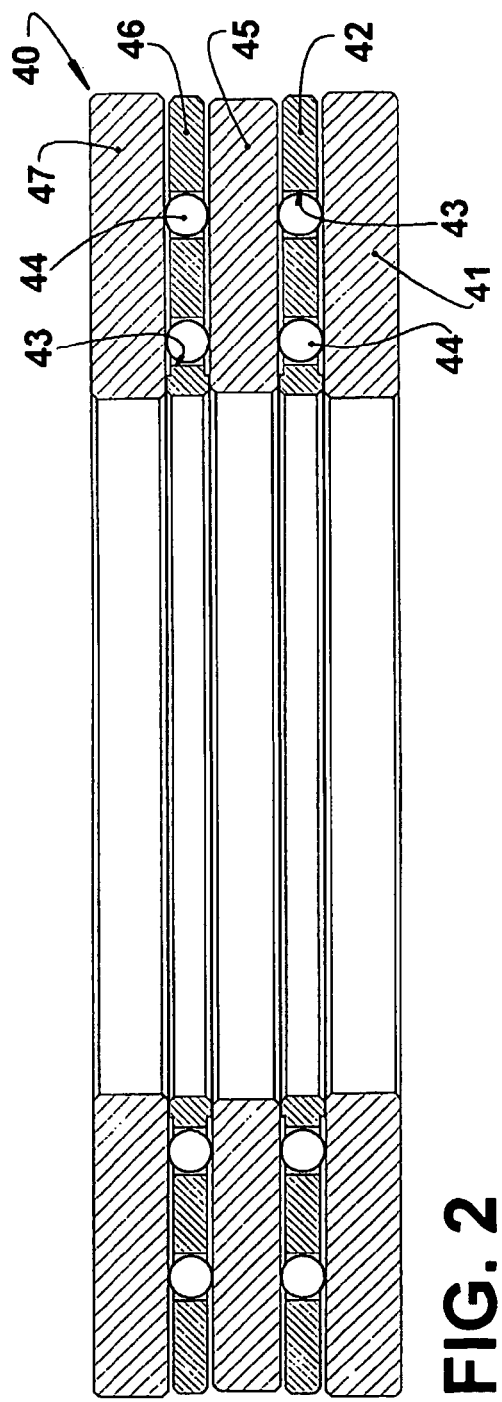
FIG. 2 is an enlarged diametrical sectional view of the self-aligning lower bearing used in the mold illustrated in FIG. 1.
Figure 3:
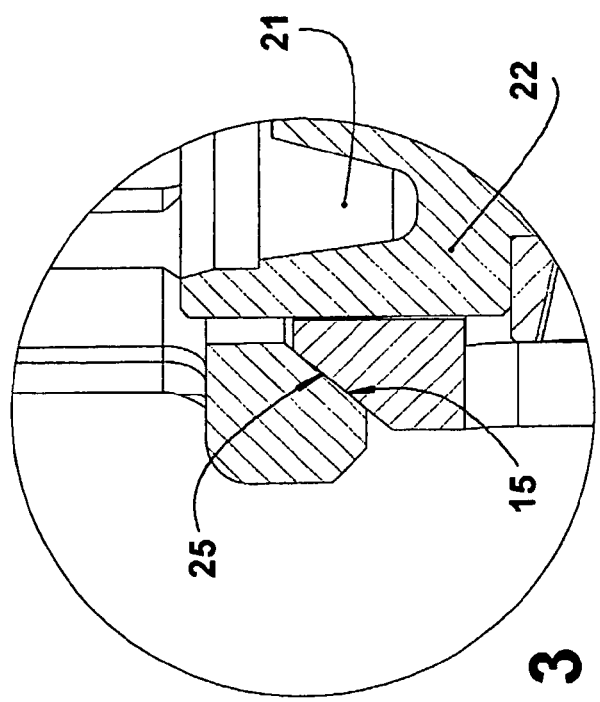
FIG. 3 is an enlarged view of part of the mold illustrated in FIG. 1, showing the seating of the annular conical guide against the annular conical seat.

The figures of the enclosed drawings illustrate the bearing arrangement applied to a centrifugation injection mold of an aluminum cage, which is incorporated into a lamination stack of an electric motor rotor, whose construction is well known in the prior art. However, it should be understood that the present bearing arrangement can be applied to molds for the centrifugation injection of other parts that can be negatively affected by the disalignment between the mold parts during the solidification of the heat injected metal.

The illustrated mold M comprises an upper mold portion 10, and a lower mold portion 20, which are relatively and axially displaceable between positions of the upper mold 10 defining an upper cavity 11 and incorporating an upper tubular projection 12 for liquid metal supply. In order to be able to rotate around its axis during the centrifugation of the liquid metal in the solidification phase inside the mold M, the upper mold portion 10 is mounted to a support S of a centrifugation injection machine by means of an upper bearing 30 comprising two rolling bearings.

The lower mold portion 20 defines a lower cavity 21 to be operatively associated with the upper cavity 11, upon the closing of the mold M in order to define the plenum that will be filled with the liquid metal. In the illustrated example, both mold cavities are respectively associated with the two opposite end faces of a lamination stack L of a rotor to be formed.

The lower mold portion 20 is mounted to the machine structure E by means of a lower bearing 40 that presents self-aligning characteristics, as will be described ahead.

In the illustrated construction, the lower cavity is formed by a lower mold block 22 seated on springs 23 carried by the lower mold portion 20, allowing the latter to be resiliently compressed against the upper mold portion 10.

According to the invention, the lower bearing 40 comprises a first flat ring 41 usually made of steel, which is affixed to the machine structure E, in a position orthogonal to the axis of the lower mold portion 20 and presenting a certain radial gap that is internal in relation to the adjacent surface of the lower mold portion 20, allowing the latter to be radially displaced in any direction, by an extension sufficient to annul the disalignments between the axis of both portions of the mold M.

On the first plane 41 is mounted an annular cage 42, in the form of a flat ring, which is provided with two concentric circular alignments of axial through housings 43 which will retain and bear respective spheres 44 with a diameter that is greater than the thickness of the cage, and which seat on the first flat ring 41. The annular cage 42 is dimensioned to present radial gaps, which are external and internal in relation to the machine structure E and to the lower mold portion 20, respectively. Thus, the annular cage 42 can be radially and relatively displaced over the flat ring 41, upon the relative radial displacements between the lower mold portion 20 and the machine structure E in the self-aligning process of both mold portions. It should be understood that the annular cage 42 might present one, two or more concentric circular or helical alignments of the axial through housings 43.

The lower bearing 40 further comprises a second flat ring 45 presenting radial gaps, which are external and internal in relation to the machine structure E and to the lower mold portion 20, respectively, in a position that is orthogonal and concentric in relation to the axis of the lower mold portion 20, in order to be seated on the spheres 44 of the annular cage 42 immediately below, axially bearing the lower mold portion 20.

The external and internal radial gaps of the second flat ring 45 allow the latter to be radially displaced, while it is seated on the spheres 44, in order to bring the axes of the mold portions to an aligned condition. In order that both portions of the mold M be conducted to an alignment condition of their axes, the lower mold portion 20 incorporates an annular conical seat 25, which is orthogonal and concentric to the axis of the lower mold portion 20, and against which is seated, when the mold M is conducted to the closed position, an annular conical guide 15 that is incorporated to the upper mold portion orthogonally and concentrically to the axis of the latter.

The closing of the mold M by the direct or indirect mutual seating of the upper mold portion 10 and lower mold portion 20 occurs before the seating of the annular conical guide on the annular conical seat 25, since the springs 23 that sustain the lower mold block 22 are compressed until the end of the approximation of the parts and the axial geometric alignment thereof by actuation of the two cooperating annular conical surfaces.

In the illustrated embodiment, on the second flat ring 45 is seated one more pair of bearings formed by another annular cage 46, which is equal to the first one and onto which is seated another flat ring 47 internally affixed to the lower mold portion 20 and presenting a radial gap that is external in relation to the machine structure E. It should be understood that the invention is not limited to two pairs of bearings, which are each defined by an annular cage and an upper flat ring affixed to the lower mold portion, and which are inferiorly seated on a first flat ring affixed to the machine structure.

What is claimed is:

1. A bearing arrangement for a centrifugation injection mold, comprising an upper mold portion and a lower mold portion, which are relatively and axially displaceable between an open mold position and a closed mold position, and which are respectively and rotatively mounted to an upper bearing and to a lower bearing that are affixed to a machine structure for the centrifugation injection, characterized in that the lower bearing comprises:
   a first flat ring affixed to the machine structure orthogonally to the axis of the lower mold portion and presenting a radial gap that is internal in relation to the lower mold portion wherein the lower mold portion is positioned above the machine structure such that the machine structure defines the outer surfaces of the radial gap and the lower mold portion defines the inner surfaces of the radial gap and wherein the first flat ring is positioned within the radial gap defined by the lower mold portion and the machine structure and is coaxial with the axis of the lower mold portion;
   an annular cage containing at least one circular alignment of axial through housings bearing respective spheres, and seated on the first flat ring coaxial with the first flat ring, said annular cage presenting radial gaps, which are external in relation to the machine structure and internal in relation to the lower mold portion; and
   a second flat ring seated on the spheres of the annular cage immediately below and coaxial with the annular cage, in order to axially bear the lower mold portion, and which presents radial gaps that are external in relation to the machine structure and internal in relation to the lower mold portion the lower mold portion incorporating an annular conical seat, which is orthogonal and concentric to the axis of said lower mold portion and on which is seated, when the mold is conducted to the closed position, an annular conical guide that is incorporated to the upper mold portion orthogonally and concentrically to the axis of said upper mold portion.

2. The bearing arrangement as set forth in claim 1, wherein the annular cage is in the form of a flat ring with a thickness inferior to the diameter of the spheres.

3. The bearing arrangement as set forth in claim 2, further comprising at least one additional bearing assembly formed by another annular cage carrying another flat ring internally affixed to the lower mold portion and presenting a radial gap that is external in relation to the machine structure, each additional bearing assembly being seated on a bearing assembly immediately below, with the lowermost bearing assembly being defined by the second flat ring and by the lower annular cage seated on the first flat ring.

4. The bearing arrangement as set forth in claim 3, wherein the annular cages of each bearing assembly are equal to each other.

5. The bearing arrangement as set forth in claim 1, wherein the annular cage has two concentric circular or helical alignments of housings.

6. The bearing arrangement as set forth in claim 5, further comprising at least one additional bearing assembly formed by another annular cage carrying another flat ring internally affixed to the lower mold portion and presenting a radial gap that is external in relation to the machine structure, each additional bearing assembly being seated on a bearing assembly immediately below, with the lowermost bearing assembly being defined by the second flat ring and by the lower annular cage seated on the first flat ring.

7. The bearing arrangement as set forth in claim 6, wherein the annular cages of each bearing assembly are equal to each other.

8. The bearing arrangement as set forth in claim 1, further comprising at least one additional bearing assembly formed by another annular cage carrying another flat ring internally affixed to the lower mold portion and presenting a radial gap that is external in relation to the machine structure, each additional bearing assembly being seated on a bearing assembly immediately below, with the lowermost bearing assembly being defined by the second flat ring and by the lower annular cage seated on the first flat ring.

9. The bearing arrangement as set forth in claim 8, wherein the annular cages of each bearing assembly are equal to each other.

* * * * *